(12) United States Patent
Hondo et al.

(10) Patent No.: US 11,661,484 B2
(45) Date of Patent: May 30, 2023

(54) EPOXY RESIN COMPOSITION FOR FIBER-REINFORCED COMPOSITE MATERIALS, AND FIBER-REINFORCED COMPOSITE MATERIAL

(71) Applicant: Toray Industries, Inc., Tokyo (JP)

(72) Inventors: Kazunori Hondo, Nagoya (JP); Norikazu Ishikawa, Nagoya (JP); Masanori Hirano, Nagoya (JP); Nobuyuki Tomioka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 81 days.

(21) Appl. No.: 16/611,358

(22) PCT Filed: May 21, 2018

(86) PCT No.: PCT/JP2018/019448
§ 371 (c)(1),
(2) Date: Nov. 6, 2019

(87) PCT Pub. No.: WO2018/216643
PCT Pub. Date: Nov. 29, 2018

(65) Prior Publication Data
US 2020/0157292 A1 May 21, 2020

(30) Foreign Application Priority Data

May 24, 2017 (JP) .............................. JP2017-102295
Oct. 6, 2017 (JP) .............................. JP2017-195707

(51) Int. Cl.
*C08J 5/04* (2006.01)
*C08G 59/46* (2006.01)
(Continued)

(52) U.S. Cl.
CPC .............. *C08J 5/042* (2013.01); *C08G 59/46* (2013.01); *C08J 3/24* (2013.01); *C08J 5/243* (2021.05);
(Continued)

(58) Field of Classification Search
None
See application file for complete search history.

(56) References Cited

U.S. PATENT DOCUMENTS 8,673,108 B2 * 3/2014 Liang .................... C09J 175/04
156/330
2006/0035088 A1 * 2/2006 Takano ................... C08G 59/18
428/413

(Continued)

FOREIGN PATENT DOCUMENTS

JP 59-219321 A 12/1984
JP 60-195119 A 10/1985
(Continued)

*Primary Examiner* — Megan McCulley
(74) *Attorney, Agent, or Firm* — DLA Piper LLP (US)

(57) ABSTRACT

An epoxy resin composition for fiber reinforced composite materials comprising components (A) to (E): component (A), an epoxy resin; component (B), a dicyandiamide or a derivative thereof; component (C), a polyisocyanate compound; component (D), a urea compound as represented by formula (1):

(1)

(Continued)

(wherein $R^1$ and $R^2$ are each independently H, $CH_3$, $OCH_3$, $OC_2H_5$, $NO_2$, halogen, or NH—CO $NR^3R^4$; and $R^3$ and $R^4$ are each independently a hydrocarbon group, allyl group, alkoxy group, alkenyl group, aralkyl group, or an alicyclic compound containing both $R^3$ and $R^4$, all containing 1 to 8 carbon atoms); and component (E), at least one compound selected from the group consisting of quaternary ammonium salts, phosphonium salts, imidazole compounds, and phosphine compounds.

18 Claims, 1 Drawing Sheet

(51) Int. Cl.
*C08J 3/24* (2006.01)
*C08J 5/24* (2006.01)
(52) U.S. Cl.
CPC ........... *C08J 5/249* (2021.05); *C08J 2363/02* (2013.01); *C08J 2463/04* (2013.01)

(56) References Cited

U.S. PATENT DOCUMENTS

| | | | | |
|---|---|---|---|---|
| 2007/0048445 A1* | 3/2007 | DiMario | ............ | C09D 5/4411 427/180 |
| 2007/0048504 A1* | 3/2007 | DiMario | ............ | C08G 18/725 428/195.1 |
| 2008/0166511 A1* | 7/2008 | Honma | ............ | C08K 3/02 428/36.4 |
| 2009/0104448 A1* | 4/2009 | Thompson | ............ | B32B 37/12 428/413 |
| 2009/0186962 A1* | 7/2009 | Kondo | ............ | C08G 59/188 523/440 |
| 2009/0264558 A1* | 10/2009 | Kramer | ............ | C09J 163/00 523/400 |
| 2010/0035041 A1* | 2/2010 | Kramer | ............ | C09J 175/04 428/320.2 |
| 2010/0178495 A1 | 7/2010 | Ichiro et al. | | |
| 2010/0273005 A1* | 10/2010 | Kramer | ............ | C09J 163/00 428/414 |
| 2011/0067813 A1* | 3/2011 | Kramer | ............ | C08G 18/4045 156/330 |
| 2011/0130479 A1* | 6/2011 | Kramer | ............ | C08G 18/10 521/178 |
| 2012/0328858 A1* | 12/2012 | Fujiwara | ............ | C08G 59/4021 428/213 |
| 2013/0130584 A1* | 5/2013 | Fujiwara | ............ | B32B 5/28 442/392 |
| 2013/0280536 A1* | 10/2013 | Voci | ............ | C09D 175/06 428/413 |
| 2014/0342144 A1* | 11/2014 | Nakayama | ............ | C08J 5/06 428/220 |
| 2016/0002460 A1* | 1/2016 | Nomura | ............ | C08J 5/24 524/558 |
| 2016/0115283 A1* | 4/2016 | Yin | ............ | C08G 59/4021 523/466 |
| 2016/0152822 A1* | 6/2016 | Bishop | ............ | C08G 59/686 525/452 |
| 2017/0287866 A1* | 10/2017 | Ikemoto | ............ | H01L 24/29 |
| 2018/0355134 A1* | 12/2018 | Reese | ............ | C08G 59/5006 |
| 2020/0056001 A1* | 2/2020 | Gehringer | ............ | C08J 5/043 |

FOREIGN PATENT DOCUMENTS

| | | |
|---|---|---|
| JP | 02-235919 A | 9/1990 |
| JP | 05-320303 A | 12/1993 |
| JP | 2001-011287 A | 1/2001 |
| JP | 2001-040121 A | 2/2001 |
| JP | 2008-214547 A | 9/2008 |
| JP | 2012-192726 A | 10/2012 |
| JP | 2014-145002 A | 8/2014 |
| JP | 2016-196590 A | 11/2016 |
| WO | 2008/149615 A1 | 12/2008 |

* cited by examiner

EPOXY RESIN COMPOSITION FOR FIBER-REINFORCED COMPOSITE MATERIALS, AND FIBER-REINFORCED COMPOSITE MATERIAL

TECHNICAL FIELD

This disclosure relates to an epoxy resin composition for fiber reinforced composite materials that serves suitably in fiber reinforced composite materials such as for aircraft members, spacecraft members, and automobile members, and also relates to a fiber reinforced composite material that is produced therefrom.

BACKGROUND

Fiber reinforced composite materials formed from reinforcing fibers and matrix resins have been in wider use in such areas as aerospace industry, sporting goods manufacturing, and other general industries since they can be designed in a variety of material forms by taking advantage of good features of the reinforcing fibers and matrix resins, and there are a variety of production methods such as the prepreg process, hand layup process, filament winding process, pultrusion process, resin transfer molding (RTM) process, and sheet molding compound process. The term "sheet molding compound" will be occasionally abbreviated as SMC.

Of those methods, the SMC molding process, which uses a hot press machine to produce an intermediate base material from a matrix resin and discontinuous reinforcing fibers, has attracted attention in recent years because of its high versatility and productivity.

In the prepreg process, which has been used conventionally, continuous reinforcing fibers (which may be in the form of unidirectionally paralleled fibers, woven fabrics and the like) are impregnated with matrix resin to prepare an intermediate base material called prepreg, and prepreg sheets are stacked first into an intended shape and then heated and pressed for curing the matrix resin to produce a fiber reinforced composite material. Although that prepreg process is suited to produce fiber reinforced composite materials with high material strength that are required to produce structural members of aircraft, automobiles and the like, the process requires many steps including prepreg preparation and stacking and can serve only for small-quantity production, that is, it is not suited for bulk production.

In the SMC molding process, on the other hand, bundle-shaped aggregates of discontinuous reinforcing fibers (commonly having fiber lengths of about 5 to 100 mm) are impregnated with a resin composition that serves as matrix resin to form a sheet, which is then processed into the so-called B stage to prepare an intermediate base material called SMC, and then the SMC is heated and pressed in a die into a required shape while curing the matrix resin, thereby producing a fiber reinforced composite material having an intended shape.

If an appropriate die is available, the SMC molding process quickly produces a fiber reinforced composite material without the need for troublesome operations for prepreg preparation and stacking steps and, in addition, it has the advantage of easy production of a fiber reinforced composite material having a complicated shape.

The fibers that can be used as reinforcement include glass fiber, aramid fiber, carbon fiber, and boron fiber. Both thermosetting resins and thermoplastic resins may serve as matrix resin, but thermosetting resins are in wider use because they serve easily to impregnate reinforcing fiber. As the thermosetting resins, epoxy resins, unsaturated polyester resins, vinyl ester resins, phenol resins, bis-maleimide resins, cyanate resins and the like are used. Of these, epoxy resins are in wide use from the viewpoint of mechanical properties such as adhesion to reinforcing fiber, dimensional stability, and the strength and rigidity of resulting composite materials.

The resin composition serving as matrix resin in a SMC has to be low in viscosity so that it can fully impregnate the reinforcing fiber. On the other hand, the matrix resin processed into the B stage should be such that the film attached to each face in the SMC preparation step can be removed easily before the molding step. In addition, the SMC in the molding step should have good flow properties that permit the production of a fiber reinforced composite material in which reinforcing fibers are dispersed uniformly in the matrix resin to ensure high dynamic strength. Shortening of the curing time of the matrix resin is an essential factor in permitting highly efficient production of a fiber reinforced composite material. Epoxy resins have high heat resistance and good mechanical properties, but compared to vinyl ester resins and the like, on the other hand, they are difficult to process into the B stage to such a degree that a fiber reinforced composite material in which reinforcing fibers are dispersed uniformly in the matrix resin can be produced and, in addition, they have the disadvantage of long curing times. Improvement in these points is now called for strongly. On the other hand, the curing of the resin should progress slowly and uniformly and end in not too short a time to obtain a fiber reinforced composite material having a good surface quality, which is an important property when applying the material to exterior parts of automobiles and the like.

In view of this situation, Japanese Unexamined Patent Publication (Kokai) No. HEI-5-320303 discloses a resin composition consisting of a polyisocyanate compound and an epoxy resin incorporating a hydroxyl group-containing sorbitol polyglycidyl ether and proposes a method to process it into the B stage without suffering from a decrease in heat resistance, which is an inherent good property of epoxy resins (Japanese Unexamined Patent Publication (Kokai) No. HEI-5-320303).

To realize the shortening of curing periods, studies have been performed about the addition of a curing accelerator and, for example, there is a proposal of the combined use of a urea compound and an organic tin compound as a method to improve the curing performance (Japanese Unexamined Patent Publication (Kokai) No. SHO-59-219321).

In recent years, furthermore, there is a proposal of a method that uses a radical-polymerizable unsaturated compound and a photopolymerization initiator, which are blended with an epoxy resin and exposed to ultraviolet rays to realize easy conversion into the B stage and that also improves the curing performance (Japanese Unexamined Patent Publication (Kokai) No. 2016-196590).

To produce a fiber reinforced composite material having a good surface quality, there are studies that investigate the shape of the bundle-shaped aggregates of discontinuous reinforcing fibers and propose, for example, a method that realizes improved homogeneity between bundle-shaped aggregates and fibers by arranging the ends of the bundle-shaped aggregates and the alignment direction of the reinforcing fibers with an angle of 12° formed between them (International Publication No. WO 2008/149615).

The aforementioned method described in Japanese Unexamined Patent Publication (Kokai) No. HEI-5-320303 can realize an adequate degree of conversion into the B stage as a result of the formation of high-molecular weight mers through a reaction between the sorbitol polyglycidyl ether and polyisocyanate and also develop a high heat resistance, but it cannot realize a sufficiently high curing performance.

The method described in Japanese Unexamined Patent Publication (Kokai) No. SHO-59-219321 has an effect in improving the curing performance, but the effect is not sufficiently large and it cannot realize a sufficiently high heat resistance, either.

The method described in Japanese Unexamined Patent Publication (Kokai) No. 2016-196590 makes effective use of photopolymerization of a radical-polymerizable unsaturated compound to realize easy conversion into the B stage and also ensures an increase in the curing performance, but it cannot realize a sufficiently high heat resistance.

In the method described in International Publication No. WO 2008/149615, furthermore, a SMC consisting of bundle-shaped aggregates and a vinyl ester resin arranged so that the ends of the bundle-shaped aggregates of discontinuous reinforcing fibers and the alignment direction of the reinforcing fibers make an angle of 12° to each other is press-molded to produce a fiber reinforced composite material that has a high homogeneity between bundle-shaped aggregates and resin and contains fewer voids, but since the vinyl ester resin sometimes releases a relatively large amount of heat immediately after the start of curing to cause rapid progress of curing, curing may occur rapidly in some portions and slowly in other portions during the entire curing process from its start to completion, possibly having an adverse influence on the surface quality.

As described above, there is the problem of difficulty for the conventional techniques in realizing an adequate degree of conversion into the B stage while achieving both quick curing in a short time and a high heat resistance and there is also a call for stable production of fiber reinforced composite materials having improved surface quality and bending strength.

Thus, it could be helpful to provide an epoxy resin composition that can be converted easily into the B stage, can be cured in a short time, and has a high heat resistance. It could also be helpful to make use of such an epoxy resin composition to provide a fiber reinforced composite material having a high bending strength and provide a SMC containing an epoxy resin composition that allows the matrix resin to cure slowly and uniformly and forming a fiber reinforced composite material having a good surface quality and high bending strength.

SUMMARY

We thus provide:

An epoxy resin composition for fiber reinforced composite materials including the following components (A) to (E):
component (A): an epoxy resin
component (B): a dicyandiamide or a derivative thereof
component (C): a polyisocyanate compound
component (D): a urea compound as represented by formula (1)

(1)

($R^1$ and $R^2$ are each independently H, $CH_3$, $OCH_3$, $OC_2H_5$, $NO_2$, halogen, or NH—CO—$NR^3R^4$. $R^3$ and $R^4$ are each independently a hydrocarbon group, allyl group, alkoxy group, alkenyl group, aralkyl group, or an alicyclic compound containing both $R^3$ and $R^4$, all containing 1 to 8 carbon atoms.)

component (E): at least one compound selected from the group consisting of quaternary ammonium salts, phosphonium salts, imidazole compounds, and phosphine compounds.

A SMC containing reinforcing fiber is impregnated with the aforementioned epoxy resin composition and a fiber reinforced composite material is produced by curing the SMC.

The SMC may be configured as follows. Specifically, a SMC contains bundle-shaped aggregates of discontinuous reinforcing fibers and an epoxy resin composition for fiber reinforced composite materials, the bundle-shaped aggregates being such that in the plane that has the largest width perpendicular to the alignment direction of the reinforcing fibers, the two acute angles, represented as angle a and angle b, formed between the alignment direction of the reinforcing fibers and the sides formed by the arrays of both ends of the bundle-shaped aggregates are 2° or more and 30° or less, and the epoxy resin composition containing components (A) to (C) described below and giving a half-width ΔT of 15° C. or more and 50° C. or less on the heat flow graph in which the vertical axis and the horizontal axis show the heat flow measured by differential scanning calorimetry and the temperature, respectively.
component (A): an epoxy resin
component (B): a dicyandiamide or a derivative thereof
component (C): a polyisocyanate compound
In addition, a fiber reinforced composite material is produced by curing the SMC.

We thus provide an epoxy resin composition for fiber reinforced composite materials serving to form a fiber reinforced composite material that can be easily converted into the B stage and has a high curing performance, high heat resistance, and high bending strength.

Furthermore, we provide a SMC containing an epoxy resin composition that allows the matrix resin to cure slowly and uniformly and form a fiber reinforced composite material having a good surface quality and high bending strength.

DETAILED DESCRIPTION

A preferred example is described below.

First, an example of epoxy resin composition for fiber reinforced composite materials is described.

The epoxy resin composition for fiber reinforced composite materials is an epoxy resin composition for fiber reinforced composite materials including the following components (A) to (E):
component (A): an epoxy resin
component (B): a dicyandiamide or a derivative thereof
component (C): a polyisocyanate compound component (D): a urea compound as represented by formula (1)

(R¹ and R² are each independently H, $CH_3$, $OCH_3$, $OC_2H_5$, $NO_2$, halogen, or $NH-CO-NR^3R^4$. $R^3$ and $R^4$ are each independently a hydrocarbon group, allyl group, alkoxy group, alkenyl group, aralkyl group, or an alicyclic compound containing both $R^3$ and $R^4$, all containing 1 to 8 carbon atoms.)

component (E): at least one compound selected from the group consisting of quaternary ammonium salts, phosphonium salts, imidazole compounds, and phosphine compounds.

The addition of components (D) and (E) to a resin composition composed of components (A), (B), and (C) realizes a viscosity after conversion into the B stage and a short-time curing performance at a high level that cannot be achieved by adding only component (D), which is a generally known conventional component.

The component (A is essential to develop heat resistance and mechanical properties. The epoxy resin of the component (A) means a compound that has one or more epoxy groups in one molecule.

There are no specific limitations on the epoxy resin of the component (A) as long as it is a compound having one or more epoxy groups in one molecule. Examples of bifunctional epoxy resins include bisphenol A type epoxy resin, bisphenol F type epoxy resin, bisphenol S type epoxy resin, biphenyl type epoxy resin, dicyclopentadiene type epoxy resin, and modified epoxy resins thereof. Examples of tri- or higher functional polyfunctional epoxy resins include, but not limited to, novolac type epoxy resins such as phenol novolac type epoxy resin and cresol novolac type epoxy resin; glycidyl amine type epoxy resins such as tetraglycidyl diaminodiphenyl methane, triglycidyl aminophenol type epoxy resin, and tetraglycidyl amine type epoxy resin; glycidyl ether type epoxy resins such as tetrakis(glycidyloxyphenyl) ethane and tris(glycidyloxy methane), modified epoxy resins thereof, and brominated epoxy resins produced through bromination of these epoxy resins. A combination of a plurality of these epoxy resins may be used as component (A). In particular, bisphenol A type epoxy resin, bisphenol F type epoxy resin, bisphenol S type epoxy resin, phenol novolac type epoxy resin, and cresol novolac type epoxy resin can be used suitably. The use of these epoxy resins has the additional effect of providing a fiber reinforced composite material having improved mechanical strength compared to, for example, the use of highly rigid epoxy resins such as those having naphthalene backbones in their molecules. This is because, whereas highly rigid epoxy resins tend to suffer from strain when cured in a short time, which causes an increase in crosslink density, such problems are unlikely to occur easily when the above epoxy resins are used.

Commercial products of bisphenol A type epoxy resin include jER (registered trademark) 825, jER (registered trademark) 826, jER (registered trademark) 827, jER (registered trademark) 828, jER (registered trademark) 834, jER (registered trademark) 1001, jER (registered trademark) 1002, jER (registered trademark) 1003, jER (registered trademark) 1004, jER (registered trademark) 1004 AF, jER (registered trademark) 1007, jER (registered trademark) 1009 (all manufactured by Mitsubishi Chemical Corporation), Epicron (registered trademark) 850 (manufactured by DIC Corporation), Epotohto (registered trademark) YD-128 (manufactured by Nippon Steel & Sumikin Chemical Co., Ltd.), DER (registered trademark)-331, and DER (registered trademark)-332 (both manufactured by The Dow Chemical Company).

Commercial products of bisphenol F type epoxy resin include jER (registered trademark) 806, jER (registered trademark) 807, jER (registered trademark) 1750, jER (registered trademark) 4004P, jER (registered trademark) 4007P, jER (registered trademark) 4009P (all manufactured by Mitsubishi Chemical Corporation), Epicron (registered trademark) 830 (manufactured by DIC Corporation), Epotohto (registered trademark) YDF-170, Epotohto (registered trademark) YDF2001, and Epotohto (registered trademark) YDF2004 (all manufactured by Nippon Steel & Sumikin Chemical Co., Ltd.). Commercially available products of tetramethyl bisphenol F type epoxy resin, which is an alkyl substitution product, include Epotohto (registered trademark) YSLV-80XY (manufactured by Nippon Steel & Sumikin Chemical Co., Ltd.).

Commercially available products of bisphenol S type epoxy resin include Epicron (registered trademark) EXA-1515 (manufactured by DIC Corporation).

Commercially available products of phenol novolac type epoxy resin include jER (registered trademark) 152, jER (registered trademark) 154 (both manufactured by Mitsubishi Chemical Corporation), Epicron (registered trademark) N-740, Epicron (registered trademark) N-770, and Epicron (registered trademark) N-775 (all manufactured by DIC Corporation).

Commercial products of cresol novolac type epoxy resin include Epicron (registered trademark) N-660, Epicron (registered trademark) N-665, Epicron (registered trademark) N-670, Epicron (registered trademark) N-673, and Epicron (registered trademark) N-695 (all manufactured by DIC), and EOCN-1020, EOCN-102S, and EOCN-104S (all manufactured by Nippon Kayaku Co., Ltd.).

The component (B) is a dicyandiamide or a derivative thereof. Dicyandiamide is widely used as a curing agent for epoxy resins because of its excellent ability to produce cured resins having good mechanical properties and high heat resistance. Furthermore, a resin composition prepared by adding dicyandiamide as curing agent can be used suitably because of being high in storage stability. Derivatives of dicyandiamide, which are compounds formed by bonding various compounds to dicyandiamide, can serve effectively, like dicyandiamide, for providing cured resins having good mechanical properties, high heat resistance, etc., and resin compositions prepared by using a dicyandiamide derivative as curing agent are generally high in storage stability. Examples of dicyandiamide derivatives include those produced by bonding various compounds such as epoxy resin, vinyl compound, acrylic compound, and 9,10-dihydro-9-oxa-10-phosphaphenanthrene-10-oxide to dicyandiamide. Each of these may be used singly or two or more thereof may be used in combination or they may be used in combination with dicyandiamide. Examples of commercially available dicyandiamide products include DICY7 and DICY15 (manufactured by Mitsubishi Chemical Corporation).

Component (B) preferably accounts for 1 to 50 parts by mass relative to 100 parts by mass of component (A). If component (B) accounts for 1 parts by mass or more relative to 100 parts by mass of component (A), it is preferable because it effectively improves the curing performance, whereas a content of 50 parts by mass or less is preferable because it develops a high heat resistance. From such a point of view, it is more preferably 1 to 20 parts by mass.

The component (C) is a polyisocyanate compound. There are no specific limitations on this as long as it has two or more isocyanate groups on the average in one molecule and generally known aliphatic isocyanates and aromatic isocyanates will be useful. Aliphatic isocyanates that can be used as polyisocyanate compounds for component (C) include, for example, ethylene diisocyanate, trimethylene diisocyanate, dodecamethylene diisocyanate, hexamethylene diisocyanate, tetramethylene diisocyanate, pentamethylene diisocyanate, propylene-1,2-diisocyanate, 2,3-dimethyltetramethylene diisocyanate, butylene-1,2-diisocyanate, butylene-1,3-diisocyanate, 1,4-diisocyanate hexane, cyclopentene-1,3-diisocyanate, isophorone diisocyanate, 1,2,3,4-tetraisocyanate butane, and butane-1,2,3-triisocyanate. Aromatic isocyanates that can be used as polyisocyanate compounds for component (C) include, for example, aromatic isocyanates such as p-phenylene diisocyanate, 1-methylphenylene-2,4-diisocyanate, naphthalene-1,4-diisocyanate, tolylene diisocyanate, diphenyl-4,4-diisocyanate, benzene-1,2,4-triisocyanate, xylylene diisocyanate, diphenylmethane diisocyanate (MDI), diphenylpropane diisocyanate, tetramethylene xylene diisocyanate, and polymethylene polyphenyl polyisocyanate, as well as those having a structure containing some of these aromatic isocyanates bonded by methylene groups and the like. A prepolymer prepared by preliminary polymerization of one of these polyisocyanate compounds and a polyol compound may also be used. These polyisocyanate compounds may be used singularly or as a mixture of two or more thereof.

Component (C) preferably accounts for 1 to 50 parts by mass relative to 100 parts by mass of component (A). If component (C) accounts for 1 part by mass or more relative to 100 parts by mass of component (A), it is preferable because the conversion into the B stage can progress to a sufficiently high degree to permit the formation of a fiber reinforced composite material in which reinforcing fibers are dispersed uniformly in a matrix resin to develop good mechanical properties, whereas a content of 50 parts by mass or less allows the SMC to expand sufficiently in the die during the hot press molding step. From such a point of view, the content is more preferably 5 to 30 parts by mass.

The component (D) is a urea compound as represented by formula (1).

(1)

(In the formula, $R^1$ and $R^2$ are each independently H, $CH_3$, $OCH_3$, $OC_2H_5$, $NO_2$, halogen, or $NH-CO-NR^3R^4$. $R^3$ and $R^4$ are each independently a hydrocarbon group, allyl group, alkoxy group, alkenyl group, aralkyl group, or an alicyclic compound containing both $R^3$ and $R^4$, all containing 1 to 8 carbon atoms.)

It is preferable for the hydrocarbon groups in $R^3$ and $R^4$ to be alkyl groups. In the hydrocarbon group, allyl group, alkoxy group, alkenyl group, aralkyl group, and alicyclic compound containing both $R^3$ and $R^4$, part of the hydrogen atoms may be replaced with substituent groups or atoms other than those listed above (for example, halogen atoms) as long as 1 to 8 carbon atoms are contained.

Urea compounds as represented by formula (1) that can be used as component (D) include, for example, 3-phenyl-1,1-dimethyl urea, 3-(3,4-dichlorophenyl)-1,1-dimethyl urea, 3-(3-chloro-4-methylphenyl)-1,1-dimethyl urea, and 2,4-bis(3,3-dimethylureido) toluene, which may be used singly or as a mixture of two or more thereof. Of these, 2,4-bis(3,3-dimethylureido) toluene is the most preferable because it works to largely shorten the curing period.

In the fiber reinforced resin composition, component (D) preferably accounts for 1 to 15 parts by mass relative to 100 parts by mass of component (A). If component (D) accounts for 1 part by mass or more relative to 100 parts by mass of component (A), it is preferable because it effectively improves the curing performance, and the content is more preferably 2 parts by mass or more and still more preferably 3.5 parts by mass or more. If component (D) accounts for 15 parts by mass or less relative to 100 parts by mass of component (A), it is preferable because it will not cause a decrease in heat resistance, and the content is more preferably 10 parts by mass or less.

The component (E) is at least one compound selected from the group consisting of quaternary ammonium salts, phosphonium salts, imidazole compounds, and phosphine compounds. Examples of the quaternary ammonium salt include tetramethyl ammonium chloride, tetramethyl ammonium bromide, tetramethyl ammonium iodide, and tetrabutyl ammonium bromide; examples of the phosphonium salt include allyltriphenyl phosphonium bromide, diallyldiphenyl phosphonium bromide, ethyltriphenyl phosphonium chloride, ethyltriphenyl phosphonium iodide, tetrabutyl phosphonium acetate, tetrabutyl phosphonium chloride, tetrabutyl phosphonium bromide, and tetrabutyl phosphonium iodide; examples of the imidazole compound include 2-phenyl imidazole and 2-methyl imidazole; and examples of the phosphine compound include triphenyl phosphine. As described above, component (E) is at least one compound selected from the group consisting of quaternary ammonium salts, phosphonium salts, imidazole compounds, and phosphine compounds, and this means that a compound selected from the above ones may be used singularly or two or more of them may be used in combination. Of these, the use of a quaternary ammonium salt and/or a phosphine compound as component (E) is preferable because they work to largely shorten the curing period.

Component (E) preferably accounts for 1 to 15 parts by mass relative to 100 parts by mass of component (A). If component (E) accounts for 1 part by mass or more relative to 100 parts by mass of component (A), it is preferable because it effectively allows the conversion into the B stage to progress to a sufficient degree and also improves the curing performance, and the content is more preferably 2 parts by mass or more and still more preferably 3.5 parts by mass or more. If component (E) accounts for 15 parts by mass or less relative to 100 parts by mass of component (A), it is preferable because it will not cause a decrease in heat resistance, and the content is more preferably 10 parts by mass or less.

The epoxy resin composition preferably has a viscosity at 70° C. of 10 mPa·s or more and 1,000 mPa·s or less, more preferably 10 mPa·s or more and 900 mPa·s or less, as measured by a type E viscometer. An epoxy resin composition having a viscosity at 70° C. of 1,000 mPa·s or less will work efficiently to impregnate reinforcing fibers, thereby providing a fiber reinforced composite material having a high surface quality. An epoxy resin composition having a viscosity at 70° C. of 10 mPa·s or more will not suffer from a significantly large decrease in viscosity in the resin impregnation step and the resin is prevented from flowing out without impregnating the reinforcing fiber base material, thus, permitting uniform impregnation of the reinforcing fiber base material. To determine the viscosity, all components are mixed and stirred for one minute and the resulting epoxy resin composition is subjected to measurement. The time point immediately after the end of the mixing and one-minute stirring of the components in the epoxy resin composition preparation step will be occasionally referred to as "immediately after preparation or mixing".

Since the curing performance of an epoxy resin composition depends on the vitrification time at the molding temperature, e.g., 140° C., of the resin composition after the conversion into the B stage, the curing performance improves and the curing time required to form a fiber reinforced composite material shortens with a decreasing vitrification time at 140° C. of the resin composition after the conversion into the B stage. Accordingly, for SMCs used particularly in the field of automobiles where productivity is emphasized, it is preferable to adopt an epoxy resin composition for which the vitrification time at 140° C. of the resin composition after the conversion into the B stage is shorter than five minutes, more preferably an epoxy resin composition for which it is shorter than four minutes, and it is preferably as short as possible. Here, the vitrification time can be measured as described below. Specifically, the dynamic viscoelasticity of the epoxy resin composition at a predetermined temperature is measured using a heat curing measurement apparatus such as ATD-1000 (manufactured by Alpha Technologies), and the complex viscosity is determined from the rise in torque caused by the curing reaction. The time required to reach a complex viscosity of $1.0 \times 10^7$ Pa·s is defined as the vitrification time.

The heat resistance of a fiber reinforced composite material produced from the epoxy resin composition for fiber reinforced composite materials depends on the glass transition temperature of the cured epoxy resin produced by curing the epoxy resin composition. To provide a fiber reinforced composite material having high heat resistance, the cured epoxy resin produced by complete heat-curing at a temperature of 140° C. for two hours preferably has a glass transition temperature of 140° C. or more and 250° C. or less, more preferably 150° C. or more and 220° C. or less. If the glass transition temperature is less than 140° C., the cured epoxy resin may be likely to be low in heat resistance. If the glass transition temperature is more than 250° C., the three-dimensional crosslinked structure will be so high in crosslink density that the cured epoxy resin will be brittle, possibly resulting in a fiber reinforced composite material that is low in tensile strength, impact resistance and the like. The glass transition temperature of a cured epoxy resin prepared by curing an epoxy resin composition can be determined from measurements taken by using a dynamic viscoelasticity measurement (DMA) instrument. Specifically, a rectangular test piece cut out of a cured resin plate is subjected to DMA measurement while being heated, and the temperature at the inflection point in the resulting storage elastic modulus G' curve is determined as Tg. The measuring conditions used were as described in Examples.

The sheet molding compound, or SMC, includes an epoxy resin composition for fiber reinforced composite materials and reinforcing fibers. For the SMC, there are no specific limitations on the type and length of the reinforcing fibers or the content ratio of the reinforcing fibers and resin, but commonly it is preferable to use reinforcing fibers having fiber lengths of about 5 to 100 mm, average fiber diameter of 3 to 12 μm, fiber areal weight of 0.1 to 5 kg/m$^2$, and carbon fiber weight content of 30% to 60%. There are no specific limitations on the method to use for the production of the SMC but, for example, the SMC can be produced by impregnating reinforcing fibers with the epoxy resin composition by a generally known method suited to the features of the reinforcing fibers, and maintaining the temperature range from room temperature to about 80° C. for a few hours to a few days so that the resin composition comes in a semicured state as the viscosity rise levels off. The realization of such a semicured state where the viscosity rise of the resin composition has leveled off is referred as conversion into the B stage. To realize such conversion into the B stage, any processing conditions may be adopted in the temperature range from room temperature to about 80° C. and the time range from a few hours to a few days. In the evaluations, conversion into the B stage is realized by maintaining the epoxy resin composition at 40° C. for 24 hours so that the resin composition comes into a semicured state as the viscosity rise levels off. We believe that conversion into the B stage is realized as a result of a reaction mainly between the polyisocyanate compound and hydroxyl groups in the epoxy resin, and the viscosity of the epoxy resin composition after conversion into the B stage, which is measured at the molding temperature, for example, 140° C., using a DMA (ARES, manufactured by TA Instruments), is preferably 100 Pa·s or more and 10,000 Pa·s or less, more preferably 500 Pa·s or more and 10,000 Pa·s or less. The use of such a SMC produces an intended fiber reinforced composite material.

There are no specific limitations on the reinforcing fibers to use in the SMC, but useful ones include glass fiber, carbon fiber, graphite fiber, aramid fiber, boron fiber, alumina fiber, and silicon carbide fiber. A plurality of these reinforcing fibers may be used as a mixture. In particular, the use of carbon fiber or graphite fiber is preferred to provide a lightweight, high-durability fiber reinforced composite material. With a high specific modulus and specific strength, carbon fiber is used favorably, particularly when applied to the production of lightweight or high-strength materials.

When selecting a carbon fiber to use, various types of carbon fibers are available for different uses, but it is preferable from the viewpoint of impact resistance to adopt a carbon fiber that has a tensile modulus not more than 400 GPa. From the viewpoint of strength, the use of a carbon fiber having a tensile strength of 4.4 to 6.5 GPa is preferred because a composite material with high rigidity and high mechanical strength can be produced. Tensile elongation is also an important factor, and it is preferable to use a high-strength, high-elongation carbon fiber having a tensile elongation of 1.7% to 2.3%. The most suitable carbon fiber will have various good properties simultaneously including a tensile modulus of at least 230 GPa, tensile strength of at least 4.4 GPa, and tensile elongation of at least 1.7%.

Commercially available products of carbon fiber include Torayca (registered trademark) T800G-24K, Torayca (registered trademark) T800S-24K, Torayca (registered trademark) T700G-24K, Torayca (registered trademark) T300-3K, and Torayca (registered trademark) T700S-12K (all manufactured by Toray Industries, Inc.).

The fiber reinforced composite materials produced by curing the SMC. When intended for use in the field of automobile production, in particular, fiber reinforced composite materials produced by curing SMCs are required to have good mechanical properties including high heat resistance and bending strength. For the fiber reinforced composite material, the epoxy resin used as matrix resin will commonly have a glass transition temperature of 140° C. or more and 250° C. or less after being cured, and accordingly have a high heat resistance, and the good mechanical properties of the cured epoxy resin are reflected in the resulting composite material, which accordingly has a high bending strength of 350 MPa or more, or 400 MPa or more in a more preferred embodiment.

Described next is another example of a SMC.

Figure 1:
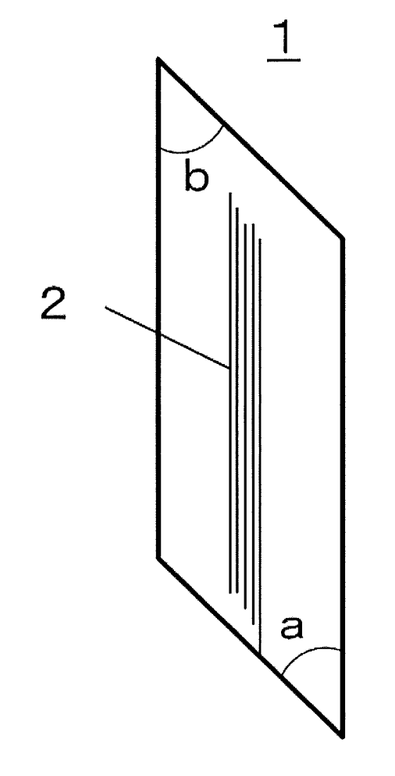
FIG. 1 is a schematic diagram of the plane that has the largest width perpendicular to the alignment direction of the reinforcing fibers in bundle-shaped aggregates, and shows the two acute angles, referred to as angle a and angle b, formed between the alignment direction of the reinforcing fibers and the sides formed by the arrays of both ends of the reinforcing fibers in bundle-shaped aggregates.

Specifically, this example of a SMC contains bundle-shaped aggregates of discontinuous reinforcing fibers and an epoxy resin composition for fiber reinforced composite materials, the bundle-shaped aggregates being such that in the plane that has the largest width perpendicular to the alignment direction of the reinforcing fibers, the two acute angles, referred to as angle a and angle b, formed between the alignment direction of the reinforcing fibers and the sides formed by the arrays of both ends of the reinforcing fibers in the bundle-shaped aggregates are 2° or more and 30° or less, and the epoxy resin composition containing components (A) to (C) described below and giving a half-width ΔT of 15° C. or more and 50° C. or less on the heat flow graph in which the vertical axis and the horizontal axis show the heat flow measured by differential scanning calorimetry and the temperature, respectively.

component (A): an epoxy resin
component (B): a dicyandiamide or a derivative thereof
component (C): a polyisocyanate compound The angle a and angle b in the bundle-shaped aggregates of discontinuous reinforcing fibers contained in the SMC are illustrated in FIG. 1.

When the SMC used contains reinforcing fibers in which both angle a and angle b are 2° or more and 30° or less and an epoxy resin composition that has components (A) to (C) and gives a half-width ΔT of 15° C. or more and 50° C. or less, the reinforcing fibers and the resin have a very high level of homogeneity that cannot be achieved by the conventional technology, making it possible to produce a fiber reinforced composite material that has a high surface quality as a result of high-level control of the surface irregularities due to sink marks formed during the curing of the resin and also has high strength.

Angle a and angle b, which occur between the sides formed by the arrays of both ends of the reinforcing fibers in the bundle-shaped aggregates and the alignment direction of the reinforcing fibers, should be as small as possible to prepare a SMC having a high homogeneity between bundle-shaped aggregates and resin, which serves effectively to provide a molded fiber reinforced composite material having an improved surface quality and strength. This effect will be particularly noticeable when angle a and angle b are 30° or less. On the other hand, however, the handleability of the bundle-shaped aggregates deteriorates as angle a and angle b decrease. In addition, the stability in the fiber cutting step decreases with a decreasing angle between the reinforcing fiber alignment direction and the cutting blade. Accordingly, it is preferable for angle a and angle b to be 2° or more. It is more preferable for angle a and angle b to be 3° or more and 25° or less. From the viewpoint of the relation between the improved surface quality and strength of the resulting fiber reinforced composite material and the processability in the bundle-shaped aggregate production step, it is still more preferable for angle a and angle b to be 5° or more and 15° or less. The angles referred to here are as illustrated in FIG. 1 as described above and represented in absolute values.

For production of bundle-shaped aggregates of discontinuous reinforcing fibers, useful machines for cutting continuous reinforcing fiber bundles include, for example, guillotine cutter, roving cutter, and other rotary cutters. The continuous reinforcing fiber bundles are cut after being inserted into a cutting machine in a state in which the length direction of the continuous reinforcing fiber bundles are at a relatively oblique angle to the cutting blade mounted in the cutting machine.

The epoxy resin composition for fiber reinforced composite materials contains the components (A) to (C) described above, and in a diagram showing the temperature on the horizontal axis and the heat flow on the vertical axis, it gives a half-width ΔT of 15° C. or more and 50° C. or less on the heat flow curve drawn in a graph in which the vertical axis and the horizontal axis represent the heat flow measured by differential scanning calorimetry and the temperature, respectively. The definitions of component (A), component (B), and component (C), preferred compounds as component (A), component (B), and component (C), and their preferred properties and contents are the same as those for the epoxy resin composition for fiber reinforced composite materials according to the first example.

Useful measuring apparatuses used for differential scanning calorimetry (DSC) include, for example, Pyris 1 DSC (manufactured by Perkin Elmer). Specifically, an epoxy resin composition is sampled on an aluminum sampling pan and measurements are taken while heating in a nitrogen atmosphere at a heating rate of 10° C./min over a temperature range from 0° C. to 300° C. to obtain a heat flow curve. On this curve, the heat flow value at the exothermic peak in the convex portion formed by the resin curing reaction is measured, and the half-width ΔT, that is, the difference between the temperatures at which the heat flow value is equal to 50% of that at the peak, which corresponds to 100%, is determined. If ΔT is 50° C. or less, complete curing can occur without leaving uncured portions and, accordingly, a high-strength fiber reinforced composite material can be produced from a SMC that contains this. If ΔT is 15° C. or more, on the other hand, curing of the resin progresses slowly and uniformly rather than rapid resin curing that can cause large heat generation and, accordingly, a homogeneous fiber reinforced composite material having a high surface quality can be produced from a SMC that contains this. From the viewpoint of producing a fiber reinforced composite material having a high surface quality, it is preferable for ΔT to be 20° C. or more and 50° C. or less. For the SMC, there are no specific limitations on the type and length of the reinforcing fibers or the content ratio of the reinforcing fibers and resin, but commonly it is preferable to use reinforcing fibers having fiber lengths of about 5 to 100 mm, average fiber diameter of 3 to 12 μm, fiber areal weight of 0.1 to 5 kg/m$^2$, and carbon fiber weight content in the range of 30% to 60%.

That is, it is preferable that the epoxy resin composition for fiber reinforced composite materials further includes the component (D) and component (E) described above. The definitions of component (D) and component (E), preferred compounds as component (D) and component (E), and their preferred properties and contents are the same as those for the epoxy resin composition for fiber reinforced composite materials according to the first example.

There are no specific limitations on the production method for the SMC as long as the cutting machine used to cut continuous reinforcing fiber bundles to prepare bundle-shaped aggregates of discontinuous reinforcing fibers meets the aforementioned requirements for angle a and angle b.

Specifically, it is possible to use the same production method as that according to the first example specified above to produce a SMC from an epoxy resin composition for fiber reinforced composite materials, except that the step for adding component (D) and component (E) is not essential and that the cutting machine used to cut continuous reinforcing fiber bundles to prepare bundle-shaped aggregates of discontinuous reinforcing fibers should meet specific requirements.

There are no specific limitations on the material of the reinforcing fibers, and it is possible to use the same one as that for the SMC according to the first example.

The fiber reinforced composite material is produced by curing the SMC. When intended for use in the field of automobile production, in particular, fiber reinforced composite materials produced by curing SMCs are required to have good mechanical properties including high heat resistance, surface quality, and bending strength. For the fiber reinforced composite material, the epoxy resin used as matrix resin will commonly have a glass transition temperature of 140° C. or more and 250° C. or less after being cured, and accordingly have a high heat resistance. Furthermore, the fiber reinforced composite material is produced by curing a SMC with a very high homogeneity containing an epoxy resin composition in which curing of the resin can progress slowly and uniformly, rather than rapid resin curing that can cause large heat generation, to permit the development of good mechanical properties and bundle-shaped aggregates of discontinuous reinforcing fibers and, accordingly, it suffers from few surface irregularities due to sink marks on the resin and has a good surface quality with an arithmetic average surface roughness Ra of 0.4 μm or less, or 0.3 μm or less in a more preferred example, and a high bending strength of 350 MPa or more, or 400 MPa or more in a more preferred example.

EXAMPLES

The epoxy resin composition for fiber reinforced composite materials according to the first example and the SMC according to the second example will now be illustrated in more detail with reference to experimental examples, but it should be understood that this disclosure is not construed as being limited to them.

Raw Resin Materials

The following input resin materials were used to prepare a resin composition in each example and comparative example. In Tables, the figures in the columns for each component of the resin compositions show their contents, which are expressed in parts by mass unless otherwise specified.

1. Epoxy Resin Used as Component (A)

Epotohto (registered trademark) YD128 (manufactured by Nippon Steel & Sumikin Chemical Co., Ltd.): bisphenol A type epoxy resin jER (registered trademark) 154 (manufactured by Mitsubishi Chemical Corporation): phenol novolac type epoxy resin 2. Dicyandiamide or a Derivative Thereof Used as Component (B)

jER Cure (registered trademark) DICY7 (manufactured by Mitsubishi Chemical Corporation): dicyandiamide 2'. Curing agent that is not a dicyandiamide or a derivative thereof (referred to as component (B'))

Rikacid (registered trademark) MH-700 (manufactured by New Japan Chemical Co., Ltd.): methyl hexahydrophthalic anhydride jER Cure (registered trademark) W (manufactured by Mitsubishi Chemical Corporation): diethyltoluenediamine 3,3'-DAS (manufactured by Mitsui Fine Chemical, Inc.): 3,3'-diaminodiphenyl sulfone 3. Polyisocyanate Compound Used as Component (C)

Lupranate (registered trademark) M20S (manufactured by BASF INOAC Polyurethanes Ltd.): polymeric MDI (polymethylene polyphenyl polyisocyanate, having a structure containing several MDIs connected by methylene groups)

Lupranate (registered trademark) MI (manufactured by BASF INOAC Polyurethanes Ltd.): monomeric MDI (diphenylmethane diisocyanate)

4. Urea Compound as Represented by Formula (1) Used as Component (D)

Omicure (registered trademark) 24 (manufactured by PTI Japan Corporation): 2,4-bis(3,3-dimethylureido) toluene DCMU 99 (manufactured by Hodogaya Chemical (Co., Ltd.): 3-(3,4-dichlorophenyl)-1,1-dimethylurea 5. Compound Used as Component (E)

Tetrabutyl ammonium bromide (manufactured by Tokyo Chemical Industry Co., Ltd.)

Tetraphenylphosphonium bromide (manufactured by Tokyo Chemical Industry Co., Ltd.)

2-methyl imidazole (manufactured by Tokyo Chemical Industry Co., Ltd.)

Triphenyl phosphine (manufactured by Tokyo Chemical Industry Co., Ltd.)

Preparation of Epoxy Resin Composition

Epoxy resin compositions were prepared by mixing the components according to the proportions specified in Tables.

Preparation of Cured Resin Plate

The epoxy resin composition prepared above was deaerated under reduced pressure and injected in a mold that was set up so that the thickness would be 2 mm by means of a 2 mm thick Teflon (trademark) spacer. Curing was performed at a temperature of 140° C. for two hours to provide a cured resin plate having a thickness of 2 mm.

Preparation of Fiber Reinforced Composite Material

Torayca (registered trademark) T700S-12K (manufactured by Toray Industries, Inc.) was used as carbon fiber. The aforementioned continuous carbon fiber strands were cut at an appropriate angle and scattered while ensuring uniform dispersion to prepare a nonwoven fabric of isotropically oriented discontinuous carbon fibers. A rotary type cutter was used as cutting machine. The blade interval was 30 mm. The nonwoven fabric of discontinuous carbon fibers had a fiber areal weight of 1 kg/m$^2$.

Using a roller, the discontinuous carbon fiber nonwoven fabric was impregnated with the aforementioned epoxy resin composition to provide a sheet-shaped fiber reinforced resin molding material in which the carbon fiber accounted for 40% by weight of the fiber reinforced resin molding material. This fiber reinforced resin molding material was converted into the B stage by maintaining it at 40° C. for 24 hours to provide a SMC. This SMC was pressed at 10 MPa under a compression type press machine and cured at about 140° C. for five minutes to produce a 300×400 mm plate of a fiber reinforced composite material.

Evaluation

The evaluations in each example were made as described below. Hereinafter, the number of measuring runs n is one (n=1) unless specified otherwise.

1. Measurement of Viscosity of Resin Composition Immediately After Preparation

The viscosity of a specimen to be examined was measured according to the "Viscosity Measuring Method with a Cone-Plate Type Rotational Viscometer" specified in JIS Z 8803

(1991) using an E type viscometer equipped with a standard cone rotor (1° 34'×R24) while maintaining the temperature at 70° C. The E type viscometer used was a TVE-30H manufactured by Tokimec, Inc. Here, to prepare a specimen, all components were mixed and stirred for one minute and the resulting epoxy resin composition was used as a specimen.

2. Measurement of Half-width ΔT of Resin Composition Immediately After Preparation A specimen to be examined was put on an aluminum sampling pan and measurements were taken using Pyris 1 DSC (manufactured by Perkin Elmer) while heating in a nitrogen atmosphere at a heating rate of 10° C./min over a temperature range from 0° C. to 300° C. to obtain a heat flow curve. On this curve, the heat flow value at the exothermic peak in the convex portion formed by the resin curing reaction was measured, and the half-width ΔT was determined as the difference between the temperatures at which the heat flow value was equal to 50% of that at the peak, which corresponded to 100%. All components were mixed and stirred for one minute and the resulting epoxy resin composition was used to prepare specimens.

3. Measurement of Viscosity of Resin Composition After Conversion into the B Stage A specimen for measurement was put on the sample stage heated at 140° C. in a DMA apparatus (ARES, manufactured by TA Instruments) and its viscosity was measured. Here, to prepare a specimen, all components were mixed and the resulting epoxy resin composition was maintained at 40° C. for 24 hours.

4. Measurement of Vitrification Time of Resin Composition After Conversion into the B Stage A specimen for measurement was put on the sample stage heated at 140° C. in a heat curing measurement apparatus (ATD-1000, manufactured by Alpha Technologies) to determine the dynamic viscoelasticity at a frequency of 1.0 Hz and a strain of 1%, from which the complex viscosity was calculated. In this instance, the time required to reach a complex viscosity of $1.0 \times 10^7$ Pa·s was defined as the vitrification time. Here, to prepare a specimen in the B stage, all components were mixed and the resulting epoxy resin composition was maintained at 40° C. for 24 hours.

5. Measurement of Glass Transition Temperature Tg of Cured Epoxy Resin

A test piece with a width of 12.7 mm and a length of 40 mm was cut out of a cured resin plate and the Tg was measured using a DMA apparatus (ARES, manufactured by TA Instruments). Measurement was performed at a temperature increase rate of 5° C./min. The temperature at the inflection point on the storage elastic modulus G' curve obtained by the measurement was defined as the Tg.

6. Measurement of Arithmetic Average of Surface Roughness Ra of Fiber Reinforced Composite Material From a plate of a fiber reinforced composite material prepared as described above, five test pieces with a size of 80×30×1.6 mm were cut out in the 0° direction (length direction of the plate is defined as 0°) and another five test pieces were cut out in the 90° direction (10 test pieces in total). The arithmetic average surface roughness of each test piece was measured using a surface roughness measuring apparatus (Surfcom 480 A, manufactured by Tokyo Seimitsu Co., Ltd.), and the average over all test pieces was adopted as Ra. Measurement was performed at a crosshead speed of 0.3 mm/s.

7. Measurement of Bending Strength of Fiber Reinforced Composite Material

From a plate of a fiber reinforced composite material prepared as described above, five test pieces with a size of 100×25×1.6 mm were cut out in the 0° direction (length direction of the plate is defined as 0°) and another five test pieces were cut out in the 90° direction (10 test pieces in total) for measurement according to JIS K7074 (1988).

Examples 1 to 3

As described above, components (A), (B), (C), (D), and (E) were mixed in the proportion specified in Table 1 to prepare an epoxy resin composition, and its viscosity at 70° C. was measured. Then, each epoxy resin composition was converted into the B stage by maintaining it at 40° C. for 24 hours, and its viscosity and vitrification time at 140° C. were measured. Furthermore, each epoxy resin composition was combined with bundle-shaped aggregates having an angle a and an angle b as given in Table 1 to prepare a SMC and a fiber reinforced composite material, followed by measuring the bending strength. Only the proportion among components (A), (B), and (C) differs among Examples 1 to 3. In all examples, the resin composition immediately after preparation had a viscosity of 1,000 mPa·s or less at 70° C. and, accordingly, it worked properly in impregnating the reinforcing fiber in the SMC preparation step. In addition, the resin composition after conversion into the B stage had a viscosity of 10,000 Pa·s or less at 140° C. and a vitrification time of less than five minutes and, accordingly, both its flowability and curing performance were favorable during the SMC hot press molding step. Furthermore, the cured resin had a Tg of 140° C. or more, and the fiber reinforced composite material also had favorable heat resistance and mechanical properties including a bending strength of 350 MPa or more.

Examples 4 to 8

As described above, components (A), (B), (C), (D), and (E) were mixed in the proportion specified in Table 2 to prepare an epoxy resin composition, and its viscosity at 70° C. was measured. Then, each epoxy resin composition was converted into the B stage by maintaining it at 40° C. for 24 hours, and its viscosity and vitrification time at 140° C. were measured. Furthermore, each epoxy resin composition was combined with bundle-shaped aggregates having an angle a and an angle b as given in Table 2 to prepare a SMC and a fiber reinforced composite material, followed by measuring the bending strength. Only the proportion among components (C), (D), and (E) differs among Examples 4 to 8. In all examples, the resin composition immediately after preparation had a viscosity of 1,000 mPa·s or less at 70° C. and, accordingly, it worked properly in impregnating the reinforcing fiber in the SMC preparation step. In addition, the resin composition after conversion into the B stage had a viscosity of 10,000 Pa·s or less at 140° C. and a vitrification time of less than five minutes and, accordingly, both its flowability and curing performance were favorable during the SMC hot press molding step. Furthermore, the cured resin had a Tg of 140° C. or more, and the fiber reinforced composite material also had favorable heat resistance and mechanical properties including a bending strength of 350 MPa or more.

Examples 9 to 13

As described above, components (A), (B), (C), (D), and (E) were mixed in the proportion specified in Table 3 to prepare an epoxy resin composition, and its viscosity at 70° C. was measured. Then, each epoxy resin composition was converted into the B stage by maintaining it at 40° C. for 24 hours, and its viscosity and vitrification time at 140° C. were measured. Furthermore, each epoxy resin composition was combined with bundle-shaped aggregates having an angle a and an angle b as given in Table 3 to prepare a SMC and a fiber reinforced composite material, followed by measuring the bending strength. Only the proportion between components (D) and (E) differs among Examples 9 to 13. In all examples, the resin composition immediately after preparation had a viscosity of 1,000 mPa·s or less at 70° C. and, accordingly, it worked properly in impregnating the reinforcing fiber in the SMC preparation step. In addition, the resin composition after conversion into the B stage had a viscosity of 10,000 Pa·s or less at 140° C. and a vitrification time of less than five minutes and, accordingly, both its flowability and curing performance were favorable during the SMC hot press molding step. Furthermore, the cured resin had a Tg of 140° C. or more, and the fiber reinforced composite material also had favorable heat resistance and mechanical properties including a bending strength of 350 MPa or more.

Example 14

As described above, components (A), (B), and (C) were mixed in the proportion specified in Table 4 to prepare an epoxy resin composition, and its viscosity at 70° C. was measured. Then, the epoxy resin composition was converted into the B stage by maintaining it at 40° C. for 24 hours, and its viscosity at 140° C. was measured. Furthermore, the epoxy resin composition was combined with bundle-shaped aggregates having an angle a and an angle b as given in Table 4 to prepare a SMC and a fiber reinforced composite material, followed by measuring the arithmetic average roughness Ra and bending strength. The resin composition immediately after preparation had a viscosity of 450 mPa·s at 70° C. and, accordingly, it worked properly in impregnating the reinforcing fiber in the SMC preparation step. In addition, the resin composition after conversion into the B stage had a viscosity of 300 Pa·s at 140° C. and, accordingly, its flowability was favorable during the SMC hot press molding step. Furthermore, the cured resin had a Tg of 140° C., and the fiber reinforced composite material also had a favorable heat resistance, surface quality, and mechanical properties including an arithmetic average roughness Ra of 0.4 μm and a bending strength of 370 MPa.

Examples 15 and 16

As described above, components (A), (B), (C), (D), and (E) were mixed in the proportion specified in Table 4 to prepare an epoxy resin composition, and its viscosity at 70° C. was measured. Then, each epoxy resin composition was converted into the B stage by maintaining it at 40° C. for 24 hours, and its viscosity at 140° C. was measured. Furthermore, each epoxy resin composition was combined with bundle-shaped aggregates having an angle a and an angle b as given in Table 4 to prepare a SMC and a fiber reinforced composite material, followed by measuring the arithmetic average roughness Ra and bending strength. Only the substance of component (E) differs between Examples 15 and 16. In both examples, the resin composition immediately after preparation had a viscosity of 1,000 mPa·s or less at 70° C. and, accordingly, it worked properly in impregnating the reinforcing fiber in the SMC preparation step. In addition, the resin composition after conversion into the B stage had a viscosity of 10,000 Pa·s or less at 140° C. and, accordingly, its flowability was favorable during the SMC hot press molding step. Furthermore, the cured resin had a Tg of 140° C. or more, and the fiber reinforced composite material also had a favorable heat resistance, surface quality, and mechanical properties including an arithmetic average roughness Ra of 0.4 μm or less and a bending strength of 350 MPa or more.

Examples 17 to 19

As described above, components (A), (B), (C), (D), and (E) were mixed in the proportion specified in Table 4 to prepare an epoxy resin composition, and its viscosity at 70° C. was measured. Then, each epoxy resin composition was converted into the B stage by maintaining it at 40° C. for 24 hours, and its viscosity at 140° C. was measured. Furthermore, each epoxy resin composition was combined with bundle-shaped aggregates having an angle a and an angle b as given in Table 4 to prepare a SMC and a fiber reinforced composite material, followed by measuring the arithmetic average roughness Ra and bending strength. Only the proportion between components (D) and (E) differs among Examples 17 to 19. In all examples, the resin composition immediately after preparation had a viscosity of 1,000 mPa·s or less at 70° C. and, accordingly, it worked properly in impregnating the reinforcing fiber in the SMC preparation step. In addition, the resin composition after conversion into the B stage had a viscosity of 10,000 mPa·s or less at 140° C. and, accordingly, its flowability was favorable during the SMC hot press molding step. Furthermore, the cured resin had a Tg of 140° C. or more, and the fiber reinforced composite material also had a favorable heat resistance, surface quality, and mechanical properties including an arithmetic average roughness Ra of 0.4 μm or less and a bending strength of 350 MPa or more.

Comparative Example 1

An epoxy resin composition was prepared in the same way as in Example 3 except for mixing components in the proportion specified in Table 5 without adding component (E), and its viscosity at 70° C. was measured. Then, the epoxy resin composition was converted into the B stage by maintaining it at 40° C. for 24 hours, and its viscosity and vitrification time at 140° C. were measured. Furthermore, each epoxy resin composition was combined with bundle-shaped aggregates having an angle a and an angle b as given in Table 5 to prepare a SMC and a fiber reinforced composite material, followed by measuring the bending strength. The resin composition immediately after preparation had a viscosity of 470 mPa·s at 70° C. and, accordingly, it worked properly in impregnating the reinforcing fiber in the SMC preparation step. However, the resin composition after conversion into the B stage had a viscosity of 60 Pa·s at 140° C. and a vitrification time of ten minutes and, accordingly, both its flowability and curing performance were poor during the SMC hot press molding step. On the other hand, the cured resin had a Tg of 150° C., and the fiber reinforced composite material also had favorable heat resistance and mechanical properties including a bending strength of 380 MPa.

Comparative Example 2

An epoxy resin composition was prepared in the same way as in Comparative Example 1 except for mixing components in the proportion specified in Table 5 with an increased quantity of component (D), and its viscosity at 70° C. was measured. Then, the epoxy resin composition was converted into the B stage by maintaining it at 40° C. for 24 hours, and its viscosity and vitrification time at 140° C. were measured. Furthermore, each epoxy resin composition was combined with bundle-shaped aggregates having an angle a and an angle b as given in Table 5 to prepare a SMC and a fiber reinforced composite material, followed by measuring the bending strength. The resin composition immediately after preparation had a viscosity of 550 mPa·s at 70° C. and, accordingly, it worked properly in impregnating the reinforcing fiber in the SMC preparation step. However, the resin composition after conversion into the B stage had a viscosity of 80 Pa·s at 140° C. and a vitrification time of eight minutes and, as expected, both its flowability and curing performance were poor during the SMC hot press molding step. On the other hand, the cured resin had a Tg of 148° C., and the fiber reinforced composite material also had favorable heat resistance and mechanical properties including a bending strength of 390 MPa.

Comparative Example 3

An epoxy resin composition was prepared in the same way as in Example 3 except for mixing components in the proportion specified in Table 5 without adding component (D), and its viscosity at 70° C. was measured. Then, the epoxy resin composition was converted into the B stage by maintaining it at 40° C. for 24 hours, and its viscosity and vitrification time at 140° C. were measured. Furthermore, each epoxy resin composition was combined with bundle-shaped aggregates having an angle a and an angle b as given in Table 5 to prepare a SMC and a fiber reinforced composite material, followed by measuring the bending strength. The resin composition immediately after preparation had a viscosity of 470 mPa·s at 70° C. and, accordingly, it worked properly in impregnating the reinforcing fiber in the SMC preparation step. In addition, the resin composition after conversion into the B stage had a viscosity of 500 Pa·s at 140° C., leading to a favorable flowability during the SMC hot press molding step. However, vitrification did not occur and the curing performance was poor. Furthermore, the poor curing performance lead to an insufficient degree of curing reaction of the epoxy resin and the curing agent. Accordingly, the cured resin had a low Tg of 130° C. and the fiber reinforced composite material had a small bending strength of 300 MN and failed to develop a high heat resistance or good mechanical properties inherent in epoxy resins.

Comparative Example 4

An epoxy resin composition was prepared in the same way as in Comparative Example 3 except for mixing components in the proportion specified in Table 5 with an increased quantity of component (E), and its viscosity at 70° C. was measured. Then, the epoxy resin composition was converted into the B stage by maintaining it at 40° C. for 24 hours, and its viscosity and vitrification time at 140° C. were measured. Furthermore, each epoxy resin composition was combined with bundle-shaped aggregates having an angle a and an angle b as given in Table 5 to prepare a SMC and a fiber reinforced composite material, followed by measuring the bending strength. The resin composition immediately after preparation had a viscosity of 550 mPa·s at 70° C. and, accordingly, it worked properly in impregnating the reinforcing fiber in the SMC preparation step. In addition, the resin composition after conversion into the B stage had a viscosity of 700 Pa·s at 140° C., leading to a favorable flowability during the SMC hot press molding step. However, vitrification did not occur and the curing performance was poor. Furthermore, the poor curing performance lead to an insufficient degree of curing reaction of the epoxy resin and the curing agent. Accordingly, the cured resin had a low Tg of 120° C. and the fiber reinforced composite material had a small bending strength of 250 MPa and failed to develop a high heat resistance or good mechanical properties inherent in epoxy resins.

Comparative Examples 5 and 6

A SMC and fiber reinforced composite material were prepared in the same way as in Example 14 except that the bundle-shaped aggregates of discontinuous reinforcing fibers used for producing a fiber reinforced composite material had an angle a and an angle b as specified in Table 6, followed by measuring the arithmetic average roughness Ra and bending strength. In both examples, the fiber reinforced composite material had an arithmetic average roughness Ra of more than 0.4 μm and a bending strength of less than 350 MPa, leading to poor surface quality and mechanical properties.

Comparative Example 7

An epoxy resin composition was prepared in the same way as in Example 14 except for using an anhydride as component (B) and mixing components in the proportion specified in Table 6, followed by measuring its viscosity at 70° C. Then, each epoxy resin composition was converted into the B stage by maintaining it at 40° C. for 24 hours, and its viscosity at 140° C. was measured. Furthermore, each epoxy resin composition was combined with bundle-shaped aggregates having an angle a and an angle b as given in Table 6 to prepare a SMC and a fiber reinforced composite material, followed by measuring the arithmetic average roughness Ra and bending strength. The resin composition immediately after preparation had a viscosity of 30 mPa·s at 70° C. and, accordingly, it worked properly in impregnating the reinforcing fiber in the SMC preparation step. In addition, the resin composition after conversion into the B stage had a viscosity of 120 Pa·s at 140° C. and, accordingly, its flowability was favorable during the SMC hot press molding step. Furthermore, the cured resin had a high heat resistance with a Tg of 142° C., but the fiber reinforced composite material had poor surface quality and mechanical properties including an arithmetic average roughness Ra of 0.5 μm and a bending strength of 300 MPa.

Comparative Example 8

An epoxy resin composition was prepared in the same way as in Example 14 except for using a liquid amine and a solid amine as component (B) and mixing components in the proportion specified in Table 6, followed by measuring its viscosity at 70° C. Then, the epoxy resin composition was converted into the B stage by maintaining it at 40° C. for 24 hours, and its viscosity at 140° C. was measured. Furthermore, the epoxy resin composition was combined with bundle-shaped aggregates having an angle a and an angle b as given in Table 6 to prepare a SMC and a fiber reinforced composite material, followed by measuring the arithmetic average roughness Ra and bending strength. The resin composition immediately after preparation had a viscosity of 400 mPa·s at 70° C. and, accordingly, it worked properly in impregnating the reinforcing fiber in the SMC preparation step. In addition, the resin composition after conversion into the B stage had a viscosity of 200 Pa·s at 140° C. and, accordingly, its flowability was favorable during the SMC hot press molding step. However, since ΔT was a large 80° C., the cured resin contained uncured portions and had a low heat resistance with a Tg of 120° C., and although the fiber reinforced composite material had a high surface quality with an arithmetic average roughness Ra of 0.3 μm, it had poor mechanical properties including a bending strength of 250 MPa.

TABLE 1

| | | | Example 1 | Example 2 | Example 3 |
|---|---|---|---|---|---|
| Epoxy resin composition | component (A) | YD 128 | 60 | 70 | 80 |
| | | jER 154 | 40 | 30 | 20 |
| | component (B) | DICY 7 | 6.5 | 6.5 | 6.4 |
| | component (C) | M20S | 6.5 | 7.6 | 8.7 |
| | | MI | — | — | — |
| | component (D) | Omicure 24 | 3 | 3 | 3 |
| | | DCMU 99 | — | — | — |
| | component (E) | tetrabutyl ammonium bromide | 3 | 3 | 3 |
| | | tetraphenyl phosphonium bromide | — | — | — |
| | | 2-methyl imidazole | — | — | — |
| | | triphenyl phosphine | — | — | — |
| Resin composition properties | immediately after preparation | viscosity at 70° C. [mPa · s] | 900 | 700 | 500 |
| | after conversion into B stage | viscosity at 140° C. [Pa · s] | 1000 | 500 | 200 |
| | | vitrification time [minutes] | 3.8 | 4 | 4.2 |
| | after curing | glass transition temperature [° C.] | 158 | 154 | 152 |
| Properties of fiber reinforced composite material | angle a and angle b [°] | | 90 | 90 | 90 |
| | bending strength [MPa] | | 350 | 370 | 400 |

TABLE 2

| | | | Example 4 | Example 5 | Example 6 | Example 7 | Example 8 |
|---|---|---|---|---|---|---|---|
| Epoxy resin composition | component (A) | YD 128 | 80 | 80 | 80 | 80 | 80 |
| | | jER 154 | 20 | 20 | 20 | 20 | 20 |
| | component (B) | DICY 7 | 6.4 | 6.4 | 6.4 | 6.4 | 6.4 |
| | component (C) | M20S | — | 8.7 | 8.7 | 8.7 | 8.7 |
| | | MI | 8 | — | — | — | — |
| | component (D) | Omicure 24 | 3 | — | 3 | 3 | 3 |
| | | DCMU 99 | — | 3 | — | — | — |
| | component (E) | tetrabutyl ammonium bromide | 3 | 3 | — | — | — |
| | | tetraphenyl phosphonium bromide | — | — | 3 | — | — |
| | | 2-methyl imidazole | — | — | — | 3 | — |
| | | triphenyl phosphine | — | — | — | — | 3 |
| Resin composition properties | immediately after preparation | viscosity at 70° C. [mPa · s] | 400 | 500 | 500 | 500 | 500 |
| | after conversion into B stage | viscosity at 140° C. [Pa · s] | 150 | 200 | 150 | 130 | 220 |
| | | vitrification time [minutes] | 4.4 | 4.5 | 4.6 | 4.7 | 3.9 |
| | after curing | glass transition temperature [° C.] | 148 | 152 | 149 | 148 | 154 |
| Properties of fiber reinforced composite material | angle a and angle b [°] | | 90 | 90 | 90 | 90 | 90 |
| | bending strength [MPa] | | 400 | 390 | 390 | 380 | 420 |

TABLE 3

| | | | Example 9 | Example 10 | Example 11 | Example 12 | Example 13 |
|---|---|---|---|---|---|---|---|
| Epoxy resin composition | component (A) | YD 128 | 80 | 80 | 80 | 80 | 80 |
| | | jER 154 | 20 | 20 | 20 | 20 | 20 |
| | component (B) | DICY7 | 6.4 | 6.4 | 6.4 | 6.4 | 6.4 |
| | component (C) | M20S | 8.7 | 8.7 | 8.7 | 8.7 | 8.7 |
| | | MI | — | — | — | — | — |
| | component (D) | Omicure 24 | 4 | 15 | 3 | 3 | 6 |
| | | DCMU 99 | — | — | — | — | — |

TABLE 3-continued

|  |  |  | Example 9 | Example 10 | Example 11 | Example 12 | Example 13 |
|---|---|---|---|---|---|---|---|
|  | component (E) | tetrabutyl ammonium bromide | 3 | 3 | 4 | 15 | 6 |
|  |  | tetraphenyl phosphonium bromide | — | — | — | — | — |
|  |  | 2-methyl imidazole | — | — | — | — | — |
|  |  | triphenyl phosphine | — | — | — | — | — |
| Resin composition properties | immediately after preparation | viscosity at 70° C. [mPa · s] | 520 | 800 | 520 | 800 | 600 |
|  | after conversion into B stage | viscosity at 140° C. [Pa · s] | 220 | 440 | 250 | 1000 | 600 |
|  |  | vitrification time [minutes] | 3.9 | 3.2 | 4 | 3.6 | 3 |
|  | after curing | glass transition temperature [° C.] | 150 | 142 | 150 | 140 | 150 |
| Properties of fiber reinforced composite material | angle a and angle b [°] |  | 90 | 90 | 90 | 90 | 90 |
|  | bending strength [MPa] |  | 440 | 420 | 430 | 400 | 450 |

TABLE 4

|  |  |  | Example 14 | Example 15 | Example 16 | Example 17 | Example 18 | Example 19 |
|---|---|---|---|---|---|---|---|---|
| Epoxy resin composition | component (A) | YD 128 | 60 | 80 | 80 | 80 | 80 | 80 |
|  |  | jER 154 | 40 | 20 | 20 | 20 | 20 | 20 |
|  | component (B) | DICY7 | 6.5 | 6.4 | 6.4 | 6.4 | 6.4 | 6.4 |
|  | component (B') | MH-700 | — | — | — | — | — | — |
|  |  | jER Cure W | — | — | — | — | — | — |
|  |  | 3,3'-DAS | — | — | — | — | — | — |
|  | component (C) | M20S | 6.5 | 8.7 | 8.7 | 8.7 | 8.7 | 8.7 |
|  | component (D) | Omicure 24 | — | 3 | 3 | 15 | 3 | 6 |
|  | component (E) | tetrabutyl ammonium bromide | — | 3 | — | 3 | 15 | 6 |
|  |  | triphenyl phosphine | — | — | 3 | — | — | — |
| Resin composition properties | immediately after preparation | ΔT [° C.] | 45 | 40 | 35 | 25 | 35 | 32 |
|  |  | viscosity at 70° C. [mPa · s] | 450 | 500 | 500 | 800 | 800 | 600 |
|  | after conversion into B stage | viscosity at 140° C. [Pa · s] | 300 | 200 | 220 | 440 | 1000 | 600 |
|  | after curing | glass transition temperature [° C.] | 140 | 152 | 154 | 142 | 140 | 150 |
| Properties of fiber reinforced composite material | angle a and angle b [°] | 12 | 12 | 12 | 12 | 12 | 12 |
|  | arithmetic average roughness Ra [μm] | 0.4 | 0.3 | 0.2 | 0.3 | 0.25 | 0.15 |
|  | bending strength [MPa] | 370 | 430 | 470 | 450 | 460 | 480 |

TABLE 5

|  |  |  | Comparative Example 1 | Comparative Example 2 | Comparative Example 3 | Comparative Example 4 |
|---|---|---|---|---|---|---|
| Epoxy resin composition | component (A) | YD 128 | 80 | 80 | 80 | 80 |
|  |  | jER 154 | 20 | 20 | 20 | 20 |
|  | component (B) | DICY7 | 6.4 | 6.4 | 6.4 | 6.4 |
|  | component (C) | M20S | 8.7 | 8.7 | 8.7 | 8.7 |
|  |  | MI | — | — | — | — |
|  | component (D) | Omicure 24 | 3 | 9 | — | — |
|  |  | DCMU 99 | — | — | — | — |
|  | component (E) | tetrabutyl ammonium bromide | — | — | 3 | 9 |
|  |  | tetraphenyl phosphonium bromide | — | — | — | — |
|  |  | 2-methyl imidazole | — | — | — | — |
|  |  | triphenyl phosphine | — | — | — | — |

TABLE 5-continued

| | | | Comparative Example 1 | Comparative Example 2 | Comparative Example 3 | Comparative Example 4 |
|---|---|---|---|---|---|---|
| Resin composition properties | immediately after preparation | viscosity at 70° C. [mPa · s] | 470 | 550 | 470 | 550 |
| | after conversion into B stage | viscosity at 140° C. [Pa · s] | 60 | 80 | 500 | 700 |
| | | vitrification time [minutes] | 10 | 8 | — | — |
| | after curing | glass transition temperature [° C.] | 150 | 148 | 130 | 120 |
| Properties of fiber reinforced composite material | angle a and angle b [°] | | 90 | 90 | 90 | 90 |
| | bending strength [MPa] | | 380 | 390 | 300 | 250 |

TABLE 6

| | | | Comparative Example 5 | Comparative Example 6 | Comparative Example 7 | Comparative Example 8 |
|---|---|---|---|---|---|---|
| Epoxy resin composition | component (A) | YD 128 | 60 | 60 | 60 | 60 |
| | | jER 154 | 40 | 40 | 40 | 40 |
| | component (B) | DICY7 | 6.5 | 6.5 | — | — |
| | component (B') | MH-700 | — | — | 88.9 | — |
| | | jER Cure W | — | — | — | 14.5 |
| | | 3,3'-DAS | — | — | — | 13.2 |
| | component (C) | M20S | 6.5 | 6.5 | 8.7 | 8.7 |
| | component (D) | Omicure 24 | — | — | — | — |
| | component (E) | tetrabutyl ammonium bromide | — | — | — | — |
| | | triphenyl phosphine | — | — | — | — |
| Resin composition properties | immediately after preparation | ΔT [° C.] | 45 | 45 | 13 | 80 |
| | | viscosity at 70° C. [mPa · s] | 450 | 450 | 30 | 400 |
| | after conversion into B stage | viscosity at 140° C. [Pa · s] | 300 | 300 | 120 | 200 |
| | after curing | glass transition temperature [° C.] | 140 | 140 | 142 | 120 |
| Properties of fiber reinforced composite material | angle a and angle b [°] | | 1 | 40 | 12 | 12 |
| | arithmetic average roughness Ra [μm] | | 0.5 | 0.6 | 0.5 | 0.3 |
| | bending strength [MPa] | | 340 | 330 | 300 | 250 |

INDUSTRIAL APPLICABILITY

The epoxy resin composition is short in the mold occupancy time during the molding step and able to form a good fiber reinforced composite material without suffering an outflow of the matrix during the heating and pressing in the SMC molding step, thus, working more favorably than the conventional matrix resins for fiber reinforcement, particularly the conventional epoxy resin compositions for SMC preparation. SMCs containing, as matrix resin, the epoxy resin composition can provide fiber reinforced composite materials that show high heat resistance and good mechanical properties inherent in the epoxy resins and can also provide fiber reinforced composite materials having good surface quality and mechanical properties, thus, serving favorably as materials for structure members of industrial equipment, automobiles, and aircraft.

The invention claimed is:
1. An epoxy resin composition for fiber reinforced composite materials comprising:
components (A) to (E):
component (A): an epoxy resin
component (B): a dicyandiamide or a derivative thereof
component (C): a poly aromatic isocyanate compound, and
component (D): a urea compound as represented by formula (1):

(1)

wherein $R^1$ and $R^2$ are each independently H, $CH_3$, $OCH_3$, $OC_2H_5$, $NO_2$, halogen, or $NH—CO—NR^3R^4$; and $R^3$ and $R^4$ are each independently a hydrocarbon group, allyl group, alkoxy group, alkenyl group, aralkyl group, or $R^3$ and $R^4$ can be connected together to form an alicyclic compound, all containing 1 to 8 carbon atoms, and component (E): at least one compound selected from the group consisting of quaternary ammonium salts, phosphonium salts, and phosphine compounds, wherein component (C) accounts for 5 to 30 parts by mass relative to 100 parts by mass of component (A).

2. The epoxy resin composition as set forth in claim 1, wherein component (E) is at least one compound selected from the group consisting of quaternary ammonium salts and phosphine compounds.

3. The epoxy resin composition as set forth in claim 1, wherein component (E) accounts for 1 part by mass or more and 15 parts by mass or less relative to 100 parts by mass of component (A).

4. The epoxy resin composition as set forth in claim 1, wherein component (D) is 2,4-bis(3,3-dimethylureido) toluene.

5. The epoxy resin composition as set forth in claim 1, wherein component (D) accounts for 1 part by mass or more and 15 parts by mass or less relative to 100 parts by mass of component (A).

6. A sheet molding compound comprising the epoxy resin composition as set forth in claim 1 and reinforcing fiber.

7. The sheet molding compound as set forth in claim 6, wherein the reinforcing fiber is carbon fiber.

8. A fiber reinforced composite material produced by curing the sheet molding compound as set forth in claim 6.

9. The epoxy resin composition as set forth in claim 1, wherein component (D) accounts for 3.5 to 10 part by mass relative to 100 parts by mass of component (A).

10. The epoxy resin composition as set forth in claim 1, wherein component (C) is a diphenylmethane diisocyanate compound.

11. A sheet molding compound comprising bundle-shaped aggregates of discontinuous reinforcing fibers and an epoxy resin composition for fiber reinforced composite materials,
the bundle-shaped aggregates being such that in a plane having a large width perpendicular to an alignment direction of the reinforcing fibers, two acute angles, referred to as angle a and angle b, formed between the alignment direction of the reinforcing fibers and sides formed by arrays of both ends of the reinforcing fibers in the bundle-shaped aggregates are 2° or more and 30° or less,
the epoxy resin composition containing components (A) to (E), and in a heat flow curve in which a vertical axis and a horizontal axis represent a heat flow measured by differential scanning calorimetry and a temperature, respectively, a half-width ΔT being 15° C. or more and 50° C. or less:
component (A): an epoxy resin
component (B): a dicyandiamide or a derivative thereof,
component (C): a poly aromatic isocyanate compound, and
component (D): a urea compound as represented by formula (1):

wherein $R^1$ and $R^2$ are each independently H, $CH_3$, $OCH_3$, $OC_2H_5$, $NO_2$, halogen, or $NH-CO-NR^3R^4$; and $R^3$ and $R^4$ are each independently a hydrocarbon group, allyl group, alkoxy group, alkenyl group, aralkyl group, or $R^3$ and $R^4$ can be connected together to form an alicyclic compound, all containing 1 to 8 carbon atoms, and
component (E): at least one compound selected from the group consisting of quaternary ammonium salts, phosphonium salts, and phosphine compounds,
wherein component (C) accounts for 5 to 30 parts by mass relative to 100 parts by mass of component (A).

12. The sheet molding compound as set forth in claim 11, wherein component (E) is at least one compound selected from the group consisting of quaternary ammonium salts and phosphine compounds.

13. The sheet molding compound as set forth in claim 11, wherein component (E) accounts for 1 part by mass or more and 15 parts by mass or less relative to 100 parts by mass of component (A).

14. The sheet molding compound as set forth in claim 11, wherein component [D] is 2,4-bis(3,3-dimethylureido) toluene.

15. The sheet molding compound as set forth in claim 11, wherein component (D) accounts for 1 part by mass or more and 15 parts by mass or less relative to 100 parts by mass of component (A).

16. The sheet molding compound as set forth in claim 11, wherein the reinforcing fiber is carbon fiber.

17. The sheet molding compound as set forth in claim 11, wherein component (D) accounts for 3.5 to 10 part by mass relative to 100 parts by mass of component (A).

18. The sheet molding compound as set forth in claim 11, wherein component (C) is a diphenylmethane diisocyanate compound.

\* \* \* \* \*